United States Patent
Kume et al.

(10) Patent No.: US 8,700,835 B2
(45) Date of Patent: Apr. 15, 2014

(54) COMPUTER SYSTEM AND ABNORMALITY DETECTION CIRCUIT

(75) Inventors: Takayuki Kume, Tokyo (JP); Yousuke Nanri, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 453 days.

(21) Appl. No.: 12/631,445

(22) Filed: Dec. 4, 2009

(65) Prior Publication Data

US 2010/0153602 A1     Jun. 17, 2010

(30) Foreign Application Priority Data

Dec. 12, 2008  (JP) ................................. 2008-317493

(51) Int. Cl.
*G06F 11/00*  (2006.01)

(52) U.S. Cl.
USPC .............................. 710/110; 714/23; 714/56

(58) Field of Classification Search
CPC ................................................... G06F 11/0745
USPC ...................................... 714/23, 56; 710/110
See application file for complete search history.

(56) References Cited

U.S. PATENT DOCUMENTS

| | | | | |
|---|---|---|---|---|
| 4,124,887 A | * | 11/1978 | Johnson et al. ................... | 700/9 |
| 4,205,374 A | * | 5/1980 | Bardsley et al. ................. | 714/56 |
| 4,621,322 A | * | 11/1986 | Suzuki et al. ................... | 714/10 |
| 5,233,964 A | * | 8/1993 | Jamoua et al. ................. | 123/479 |
| 5,321,830 A | * | 6/1994 | Nakamura et al. .............. | 714/23 |
| 5,485,594 A | * | 1/1996 | Foster ........................... | 711/100 |
| 5,488,693 A | * | 1/1996 | Houck et al. ................... | 709/208 |
| 5,495,569 A | * | 2/1996 | Kotzur ............................. | 714/2 |
| 5,544,332 A | | 8/1996 | Chen | |
| 5,583,987 A | * | 12/1996 | Kobayashi et al. ............. | 714/13 |
| 5,655,083 A | * | 8/1997 | Bagley ........................... | 714/23 |
| 5,721,869 A | * | 2/1998 | Imakawa ....................... | 711/151 |
| 5,790,785 A | * | 8/1998 | Klug et al. ....................... | 726/11 |
| 6,128,285 A | * | 10/2000 | Buhler et al. ................. | 370/242 |
| 6,145,041 A | * | 11/2000 | Chambers ...................... | 710/110 |
| 6,253,320 B1 | * | 6/2001 | Sekiguchi et al. ................ | 713/2 |
| 6,351,824 B1 | * | 2/2002 | Singh ............................. | 714/23 |
| 6,536,000 B1 | * | 3/2003 | Jackson et al. ................. | 714/57 |
| 6,633,938 B1 | * | 10/2003 | Rowlands et al. ............ | 710/240 |
| 6,714,996 B1 | * | 3/2004 | Kobayashi ........................ | 710/5 |
| 6,725,291 B2 | * | 4/2004 | Lai et al. ........................ | 710/16 |

(Continued)

FOREIGN PATENT DOCUMENTS

| | | |
|---|---|---|
| JP | 02-272657 A | 11/1990 |
| JP | 04-266112 A | 9/1992 |

(Continued)

OTHER PUBLICATIONS

Japanese Notification of Reason for Refusal issued Dec. 25, 2012, in counterpart Japanese Patent Application No. 2008-317493 (8 pages including English translation).

*Primary Examiner* — Paul R Myers
(74) *Attorney, Agent, or Firm* — Arent Fox LLP

(57) ABSTRACT

A computer system includes multiple modules that perform communication via a bus, and abnormality detection circuits that monitor signals on the bus related to communication between the modules to detect a hang-up, wherein each of the abnormality detection circuits is arranged to correspond to a part of the multiple modules, and, when detecting the hang-up, generates and outputs a signal instructing reactivation only of the corresponding module.

17 Claims, 12 Drawing Sheets

(56) References Cited

U.S. PATENT DOCUMENTS

| | | | |
|---|---|---|---|
| 6,742,139 B1* | 5/2004 | Forsman et al. | 714/23 |
| 6,862,642 B1* | 3/2005 | Packer et al. | 710/300 |
| 7,069,543 B2* | 6/2006 | Boucher | 717/127 |
| 7,165,729 B2* | 1/2007 | Bradley et al. | 235/492 |
| 7,272,755 B2* | 9/2007 | Smith | 714/47.3 |
| 7,376,870 B2* | 5/2008 | Kataria et al. | 714/47.1 |
| 7,676,622 B2* | 3/2010 | Naderi et al. | 710/305 |
| 7,840,900 B1* | 11/2010 | Rosner et al. | 715/734 |
| 2004/0252642 A1* | 12/2004 | Larson et al. | 370/235 |
| 2004/0255207 A1 | 12/2004 | Ika et al. | |
| 2005/0081115 A1* | 4/2005 | Cheng et al. | 714/47 |

FOREIGN PATENT DOCUMENTS

| | | |
|---|---|---|
| JP | 5-143197 A | 6/1993 |
| JP | 6-236329 A | 8/1994 |
| JP | 11-143814 A | 5/1999 |
| JP | 2001-209560 A | 8/2001 |
| JP | 2001-325242 A | 11/2001 |
| JP | 2004-348719 A | 12/2004 |

* cited by examiner

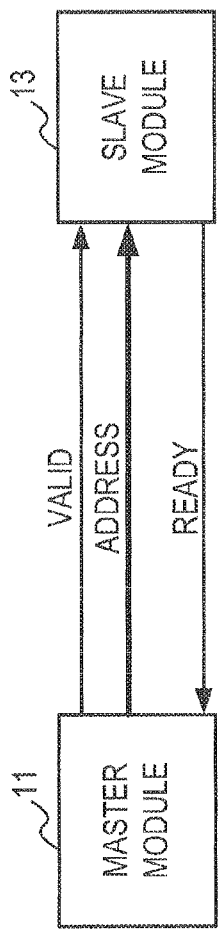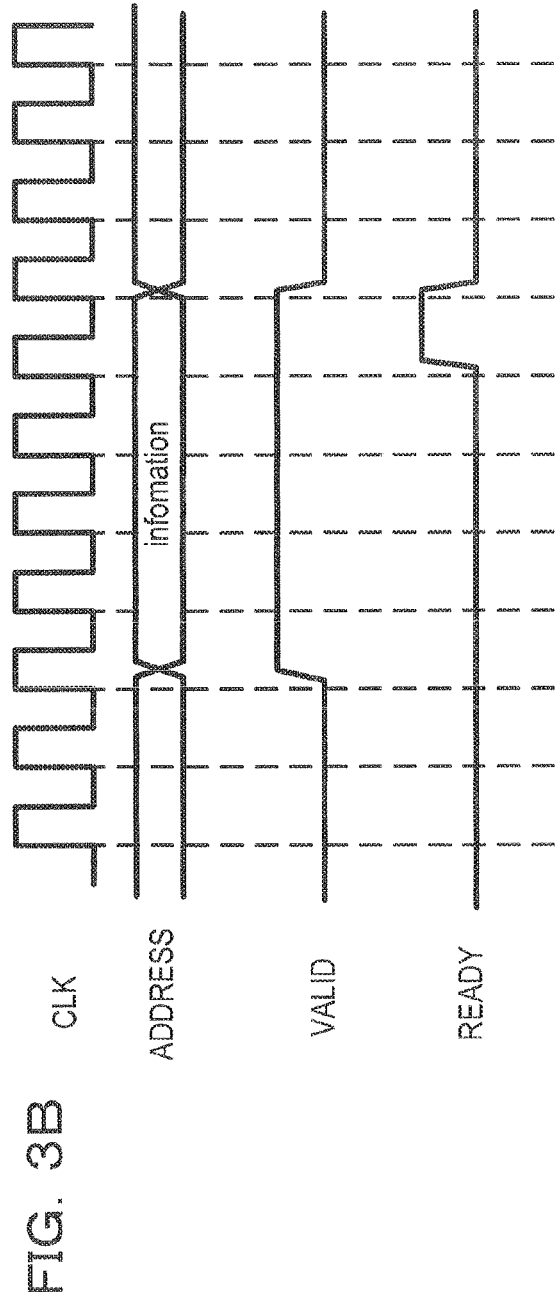
FIG. 3A
FIG. 3B

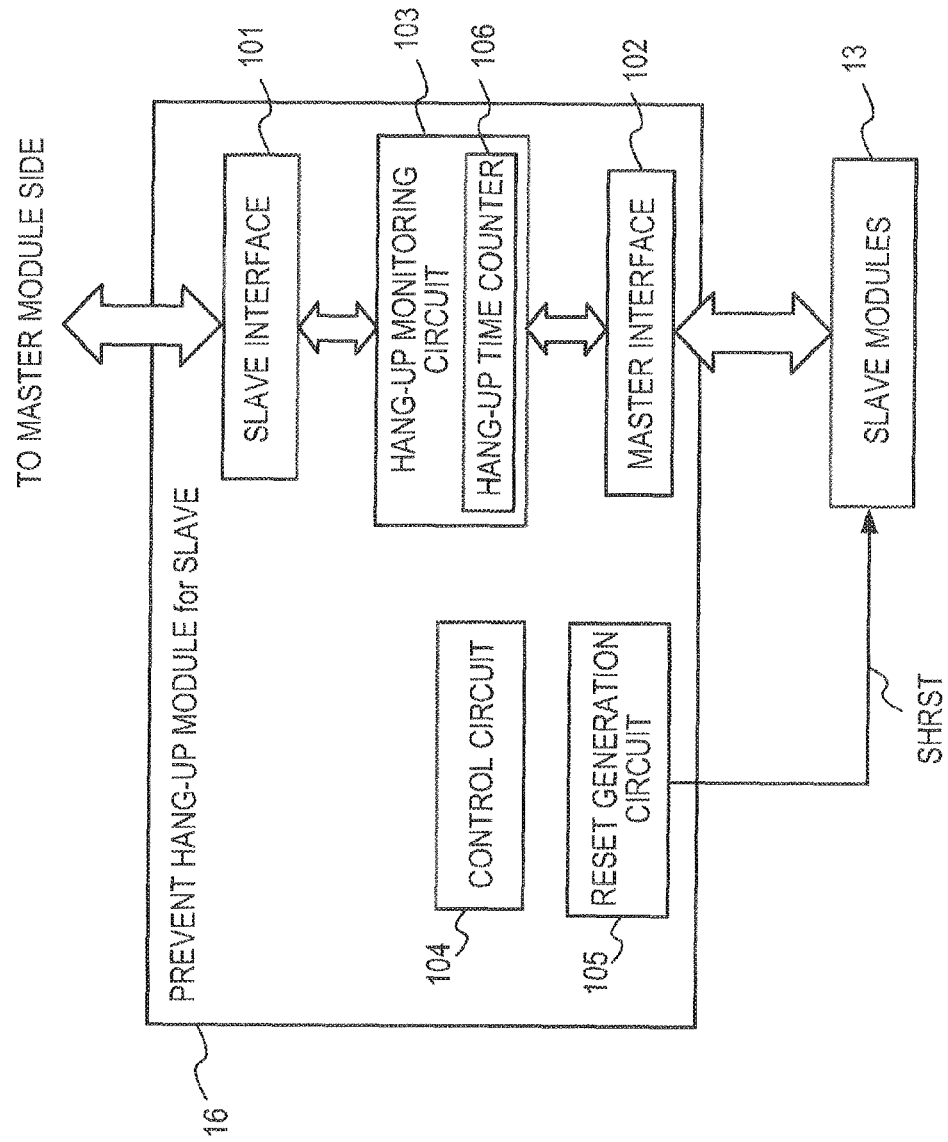

COMPUTER SYSTEM AND ABNORMALITY DETECTION CIRCUIT

CROSS-REFERENCE TO RELATED APPLICATIONS

This application is based upon and claims the benefit of priority from the prior Japanese Patent Application No. 2008-317493 filed on Dec. 12, 2008, the entire contents of which are incorporated herein by reference.

FIELD

The present invention relates to an abnormality detection circuit for detecting a hang-up state on a bus and a computer system provided with the abnormality detection circuit.

BACKGROUND

In order to perform communication between modules in a computer system having one or more master modules, such as a CPU, and one or more slave modules, it is necessary that the modules are connected to each other via a common interface. The communication between the modules is commonly performed via a bus.

If a protocol sequence stops because of some physical or logical error between a master module and the bus, or between the bus and a slave module, a state that causes the system to hang up. In a conventional computer system, detection of a hang-up and reactivation of the system with the use of a watchdog timer is performed.

The watchdog timer has a down counter, the value of which is decremented each time a predetermined time period elapses, and it generates a reset signal (or an interrupt signal) when the counter value becomes 0. After the watchdog timer is activated, a task for returning the counter value of the watchdog timer to an initial value is periodically executed in a normal state.

However, if a hang-up or the like occurs in the system, initialization of the counter value of the watchdog timer by the task is not performed, the counter value reaches 0, and a reset signal or an interrupt signal is outputted. In this way, the whole system is reset and initialized, or an interrupt is caused and the whole system is initialized within an interrupt handler, and then, the system is reactivated.

Japanese Laid-open Patent Publication No. 04-266112 discloses a method for, in a system configured by one master and one or more slaves, early finding of a hang-up caused because the power supply is not turned on at the time of activation of a system, by the master detecting whether the power supply for each slave is turned on or not.

Japanese Laid-open Patent Publication No. 06-236329 discloses an apparatus which, when detecting a deadlock state caused by substantially simultaneous bus control requests from multiple masters in a multiple bus system, masks one bus control request for a random period to avoid the deadlock state.

SUMMARY

According to an aspect of the invention, a computer system includes multiple modules that perform communication via a bus, and abnormality detection circuits that monitor signals on the bus related to communication between the modules to detect a hang-up, wherein each of the abnormality detection circuits is arranged to correspond to a part of the multiple modules, and, when detecting the hang-up, generates and outputs a signal instructing reactivation only of the corresponding module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for illustrating an example of a bus protocol in this embodiment;

FIG. 4 is a diagram illustrating a configuration example of a prevent hang-up module for slave in the first embodiment;

DESCRIPTION OF THE PREFERRED EMBODIMENTS

Embodiments of the present invention will be described on the basis of drawings.

Figure 1:
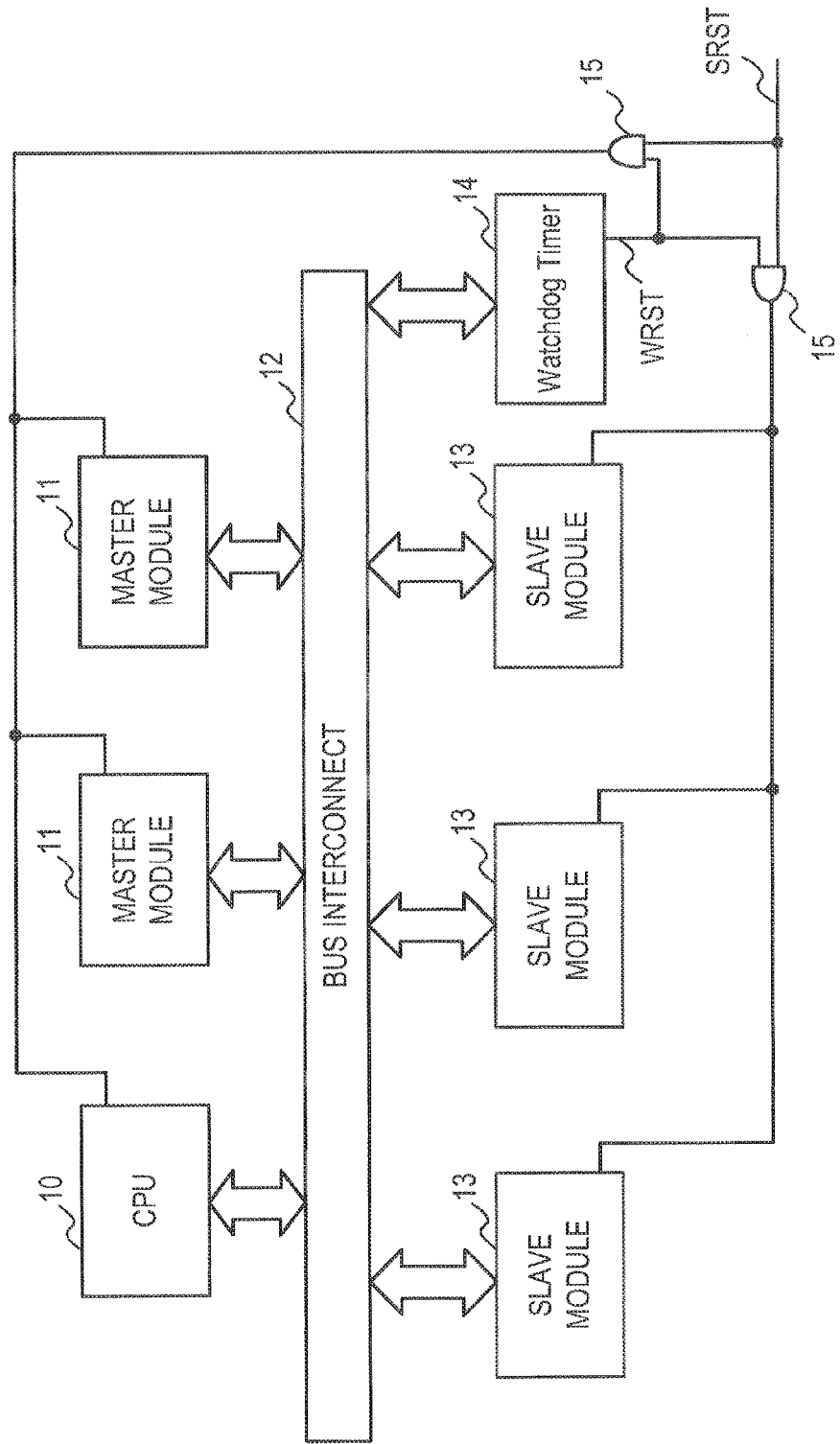
FIG. 1 is a diagram illustrating a configuration example of a computer system.

FIG. 1 is a block diagram illustrating a configuration example of a computer system. The computer system illustrated in FIG. 1 is, for example, a system LSI (Large Scale Integration) in which one or more master modules and one or more slave modules are integrated into one integrated circuit.

The computer system illustrated in FIG. 1 has a CPU 10, multiple master modules 11, a bus interconnect 12, multiple slave modules 13 and a watchdog timer 14. The CPU 10, the multiple master modules 11, and the multiple slave modules 13 are communicably connected via the bus interconnect 12.

The CPU 10 controls the modules 11, 13 and 14 in the computer system.

The master module 11 is a module for actively accessing the slave modules 13 via the bus interconnect 12 as a bus master. The master module 11 may be, for example, a DMA (Direct Memory Access) controller or a host controller of a USB (Universal Serial Bus). Though the CPU 10 is described as a module different from the master modules 11, it may also be a kind of master module.

The slave module 13 is a module that functions as a bus slave and performs various functions in response to an access request from the CPU 10 and the master modules 11. The slave module 13 may be, for example, a memory controller.

The bus interconnect 12 is used for communication among the modules 10, 11, 13 and 14, and it functions as a bus, an address decoder and the like. For example, the bus interconnect 12 decodes an access according to an access request and outputs (asserts) a selection signal (for example, a valid signal or the like) to a module corresponding to the address.

The watchdog timer 14 has a down counter, the value of which is decremented each time a predetermined time period elapses. A reset signal (watch dog reset) WRST is generated when the counter values becomes 0. An interrupt signal to the CPU 10 may be generated instead of the reset signal WRST.

After the watchdog timer 14 is activated, a task for returning the counter value to an initial value is periodically executed by the CPU 10. However, if the initialization of the counter value by the task is not executed, for example, when a hang-up occurs in the system, the counter value reaches 0, and a reset signal WRST is outputted (asserted).

Each of the reset signal WRST outputted from the watchdog timer 14, and a reset signal (system reset SRST) from the outside are outputted to the CPU 10, the master modules 11, and the slave modules 13 via an AND circuit (logical product operation circuit) 15. In the example illustrated in FIG. 1, the reset signal WRST and the reset signal SRST are at a high level ("H") when they are negated and at a low level ("L") when they are asserted.

Therefore, in the computer system illustrated in FIG. 1, when the reset signal WRST or the reset signal SRST is asserted, the whole system (the CPU 10, the master modules 11 and the slave modules 13) is initialized. When the whole system is initialized and reactivated when a hang-up occurs in the system as described above, modules which are normally operating are also initialized, and a lot of time is required before a normal state is restored.

Therefore, in the embodiments of the present invention described below, there are provided abnormality detection modules (prevent hang-up modules) for detecting a hang-up, in the computer system having multiple modules as illustrated in FIG. 1. Each of the abnormality detection modules is arranged to correspond to a part of the multiple modules (the master modules (including the CPU) and the slave modules).

When an abnormality detection module detects a hang-up, reactivation is instructed only to a master module or slave module corresponding to the abnormality detection module to cause local initialization and reactivation to be performed, without an initialization of the whole system being performed. The other master modules and slave modules are caused to keep the normal operation state. In this way, when a hang-up is detected by an abnormality detection module, only the operation of a master module or slave module corresponding to the abnormality detection module is terminated so that the system operation is continued.

(First Embodiment)

A first embodiment of the present invention will be described.

Figure 2:
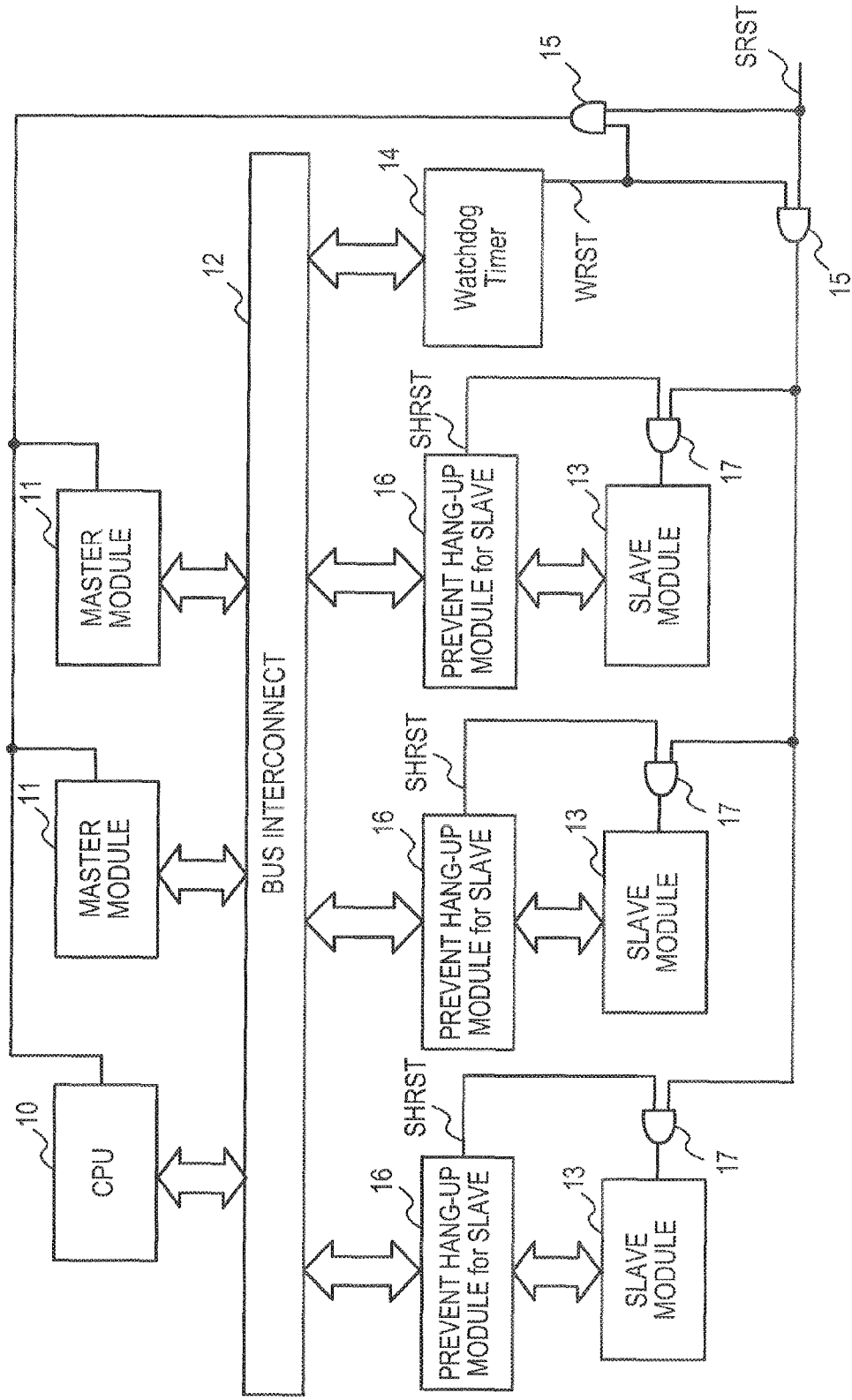
FIG. 2 is a diagram illustrating a configuration example of a computer system according to a first embodiment.

FIG. 2 is a block diagram illustrating a configuration example of a computer system according to the first embodiment. In FIG. 2, the same components as illustrated in FIG. 1 are given the same reference numerals, and redundant description thereof will be omitted.

The computer system 11 illustrated in FIG. 2 is obtained by arranging one independent prevent hang-up module for slave (abnormality detection module) 16 for each of the slave modules 13 in the computer system illustrated in FIG. 1. That is, in the computer system illustrated in FIG. 2, a prevent hang-up module for slave 16 is connected between the bus interconnect 12 and each slave module 13. Each slave module 13 performs communication with the other modules such as the master modules 11, via a corresponding prevent hang-up module for slave 16.

The prevent hang-up module for slave 16 monitors signals transmitted and received between a corresponding slave module 13 and the other modules to detect a hang-up. For example, the prevent hang-up module for slave 16 detects a hang-up by monitoring signals on the bus between the corresponding slave module 13 and the bus interconnect 12.

When detecting a hang-up, the prevent hang-up module for slave 16 generates and outputs a hang-up reset signal SHRST which instructs reactivation only of the corresponding slave module 13. In this embodiment, the hang-up reset signal SHRST is "H" when it is negated, and "L" when it is asserted.

The hang-up reset signal SHRST outputted from the prevent hang-up module for slave 16 is inputted to the corresponding slave module 13 via an AND circuit 17. In the AND circuit 17, output from the AND circuit 15, that is, the operation result of the reset signal WRST outputted from the watchdog timer 14 and the reset signal SRST from the outside are also inputted. When the output from the AND circuit 17 is "L", the slave module 13 which receives the output is initialized and activated.

In this embodiment, it is assumed that communication between the master modules 11 (including the CPU 10) and the slave modules 13 is performed in accordance with a bus protocol basically based on handshake. In the description below, it is assumed that communication among the modules in this embodiment is performed by a synchronous bus system based on handshake using a valid signal (VALID) and a ready signal (READY).

Communication among the modules in this embodiment will be described with a case wherein a master module 11 sends an address (ADDRESS) and a slave module 13 receives it as illustrated in FIG. 3A, for example. The valid signal (VALID) is a signal transmitted by an address or data transmission side to a receiving side together with an effective address or data. The ready signal (READY) is a signal transmitted by the address or data receiving side to the transmission side when the receiving side is in a state capable of receiving address or data. As illustrated in FIG. 3B, when both of the valid signal (VALID) and the ready signal (READY) are asserted, other bus signals (such as address, data and control signals) are effective. When a slave module 13 sends data and a master module 11 receives the data, the slave module 13 may output the data and a valid signal (VALID), and the master module 11 may output a ready signal (READY).

The prevent hang-up module for slave 16 monitors signals transmitted and received to establish handshake as described above (in FIG. 3, the valid signal (VALID) and the ready signal (READY)). Then, if handshake is not established for a predetermined time, that is, a ready signal (READY) corresponding to a response is negated after a valid signal (VALID) corresponding to a request is asserted, it is detected as a hang-up. The bus protocol illustrated in FIG. 3 is not limiting. In this embodiment, any protocol that is capable of, when such a state that a response from a transaction counterpart is not returned though an effective transaction has been sent to a bus continues for a predetermined period, detecting it as a hang-up is applicable.

FIG. 4 is a block diagram illustrating a configuration example of the prevent hang-up module for slave 16 in the first embodiment. The prevent hang-up module for slave 16 has a slave interface 101, a master interface 102, a hang-up monitoring circuit 103, a control circuit 104 and a reset generation circuit 105.

The slave interface 101 is an interface on the side for communicating with the master modules and is responsible for input to and output from the master module. The master interface 102 is an interface on the side for communicating with the slave modules 13 and is responsible for input to and output from the slave module. Each of the slave interface 101 and the master interface 102 gives and receives an address or data, and a valid signal or a ready signal to and from the bus interconnect 12 or the slave modules 13. At the input/output ports of the slave interface 101 and the master interface 102, there are provided signal lines suitable for a bus protocol used.

The hang-up monitoring circuit 103 detects a hang-up on the basis of signals exchanged between the slave interface 101 and the master interface 102. The hang-up monitoring circuit 103 is connected between the slave interface 101 and the master interface 102. It bypasses an input/output signal of the slave module side and an input/output signal of the master module side when there is no occurrence of hang-up.

The hang-up monitoring circuit 103 monitors a valid signal and a ready signal, and counts (measures) time which has elapsed after a valid signal is asserted, by a hang-up time counter 106. If a ready signal is not asserted though a valid signal has been asserted, that is, if a state satisfying a hang-up condition continues for a predetermined time, the hang-up monitoring circuit 103 judges a hang-up and notifies it to the control circuit 104.

The control circuit 104 controls each function section within the prevent hang-up module for slave 16. For example, when receiving a notification that a hang-up has been detected, from the hang-up monitoring circuit 103, the control circuit 104 controls each function section to perform processing in accordance with the notification. The control circuit 104 is, for example, a state machine, a CPU or the like.

If the hang-up monitoring circuit 103 detects a hang-up, the reset generation circuit 105 asserts (outputs) a hang-up reset signal SHRST which instructs reactivation of a slave module 13 corresponding to the prevent hang-up module for slave 16 on the basis of control by the control circuit 104.

Figure 5:
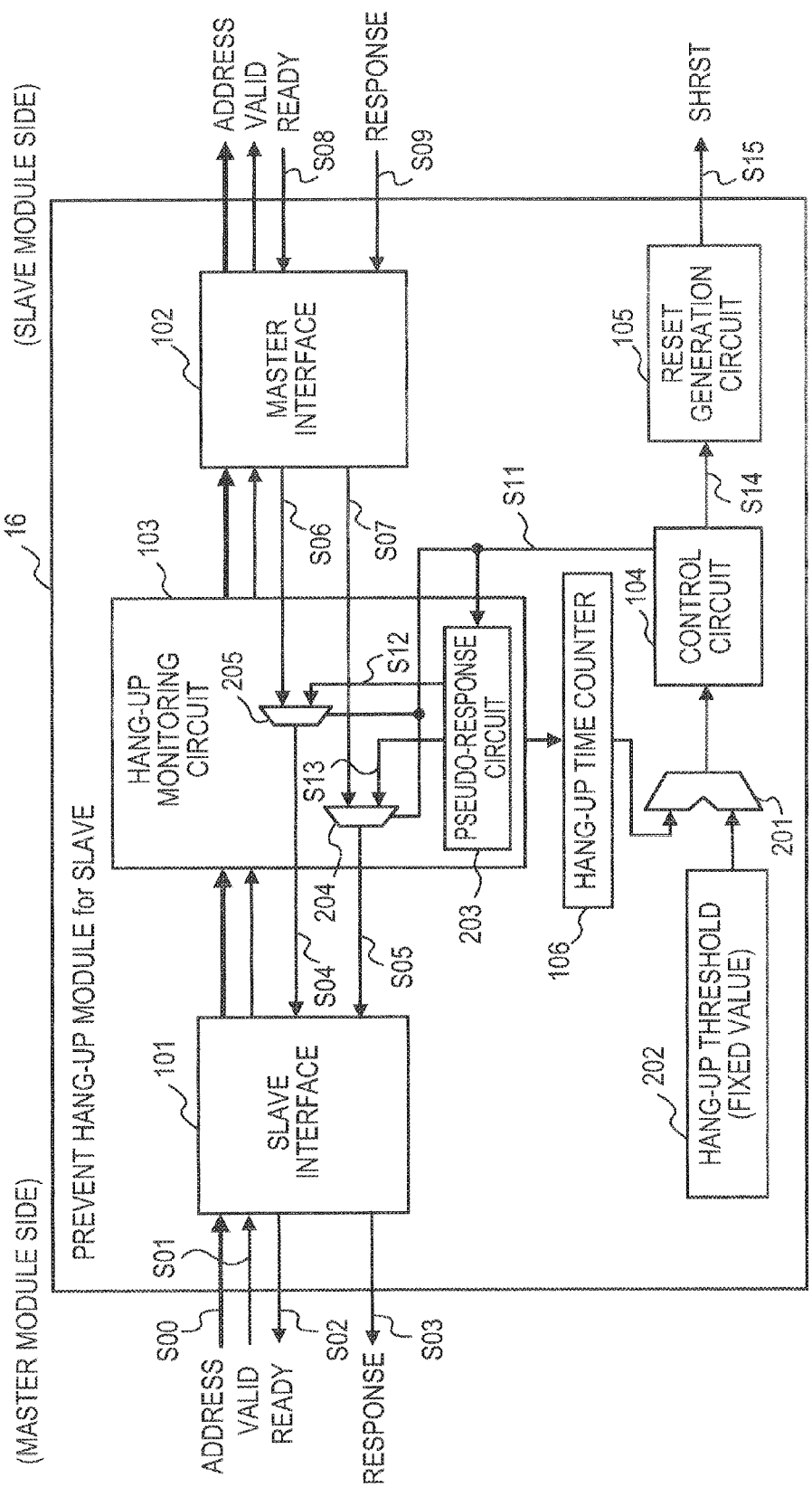
FIG. 5 is a diagram illustrating a detailed configuration example of the prevent hang-up module for slave in the first embodiment.

FIG. 5 is a diagram illustrating a detailed configuration example of the prevent hang-up module for slave 16 in the first embodiment. In FIG. 5, the same components as illustrated in FIG. 4 are given the same reference numerals, and redundant description thereof will be omitted. FIG. 5 illustrates a configuration for detection of a hang-up on the slave side in the case where transmission from the master module side is received by the slave module side.

An address signal (ADDRESS) S00 and a valid signal (VALID) S01 from the master module side are inputted to the slave interface 101. The inputted address signal S00 and valid signal S01 are outputted to the slave module side via the hang-up monitoring circuit 103 and the master interface 102.

A ready signal (READY) S08 and a response signal (RESPONSE) S09 from the salve module side are inputted to the master interface 102 and outputted to the hang-up monitoring circuit 103 as a ready signal S06 and a response signal S07. The response signals are specified in accordance with a protocol used, and, for example, an OK response, an error response, a retry response and the like are included.

The ready signal S06 outputted from the master interface 102 and a ready signal S12 outputted from a pseudo-response circuit 203 are inputted to a selector 205 of the hang-up monitoring circuit 103. The selector 205 outputs the ready signal S06 or the ready signal S12 in response to a pseudo-response request signal S11 from the control circuit 104. More particularly, the selector 205 outputs the ready signal S06 outputted from the master interface 102 in a normal state, and outputs the ready signal S12 outputted from the pseudo-response circuit 203 when a hang-up is detected.

Similarly, the response signal S07 outputted from the master interface 102 and a response signal S13 outputted from the pseudo-response circuit 203 are inputted to a selector 204 of the hang-up monitoring circuit 103. The selector 204 outputs the response signal S07 or the response signal S13 in response to the pseudo-response request signal S11 from the control circuit 104. More particularly, the selector 204 outputs the response signal S07 outputted from the master interface 102 in a normal state, and outputs the response signal S13 outputted from the pseudo-response circuit 203 when a hang-up is detected.

The pseudo-response circuit 203 is a circuit for, when a hang-up is detected, returning a response instead of a slave module which has hung up. When a hang-up is detected, the pseudo-response circuit 203 generates and outputs the pseudo-ready signal S12 and response signal S13 in response to the pseudo-response request signal S11 from the control circuit 104.

Outputs S04 and S05 from the selectors 205 and 204 of the hang-up monitoring circuit 103 are outputted to the master module side via the slave interface 101 as a ready signal S02 and a response signal S03.

The counter value of the hang-up time counter 106 and a hang-up threshold 202 are inputted to a comparator 201, and the comparator 201 outputs a result of the comparison thereof to the control circuit 104. A fixed value is set in advance as the hang-up threshold 202. In FIG. 5, the hang-up time counter 106, the comparator 201 and the hang-up threshold 202 are illustrated outside the hang-up monitoring circuit 103 for convenience of description. However, they may be provided within the hang-up monitoring circuit 103.

The hang-up monitoring circuit 103 compares the counter value of the hang-up time counter 106 and the hang-up threshold 202 by the comparator 201. As a result, if the counter value of the hang-up time counter 106 exceeds the hang-up threshold 202, that is, if the hang-up condition, wherein a ready signal is not asserted though a valid signal has been asserted, has continued for a threshold time, a hang-up is judged. Then, the hang-up monitoring circuit 103 notifies that a hang-up has been detected, to the control circuit 104.

When receiving the notification that a hang-up has been detected, from the hang-up monitoring circuit 103, the control circuit 104 gives an instruction to the hang-up monitoring circuit 103 and the reset generation circuit 105 to perform an operation for solving the hang-up.

When receiving the pseudo-response request signal S11 from the control circuit 104, the hang-up monitoring circuit 103 generates a ready signal and a response signal by the pseudo-response circuit 203 and issues them to a master module. Thereby, the hang-up state of the master module is solved, and the master module can continue a bus transaction. At the same time, when receiving a reset request signal S14 from the control circuit 104, the reset generation circuit 105 generates a hang-up reset signal SHRST (S15) which instructs reactivation of a slave module and issues it to the corresponding slave module.

As for generation of a reset signal, such a configuration is also possible in which, without providing the reset generation circuit 105 within the prevent hang-up modules for slaves 16, a reset controller or the like on an external system is instructed to reset only a corresponding slave module. Such a configuration is also possible in which a slave module is reset by generating an interrupt to the CPU and controlling a reset controller or the like on the system from the CPU.

Figure 6:
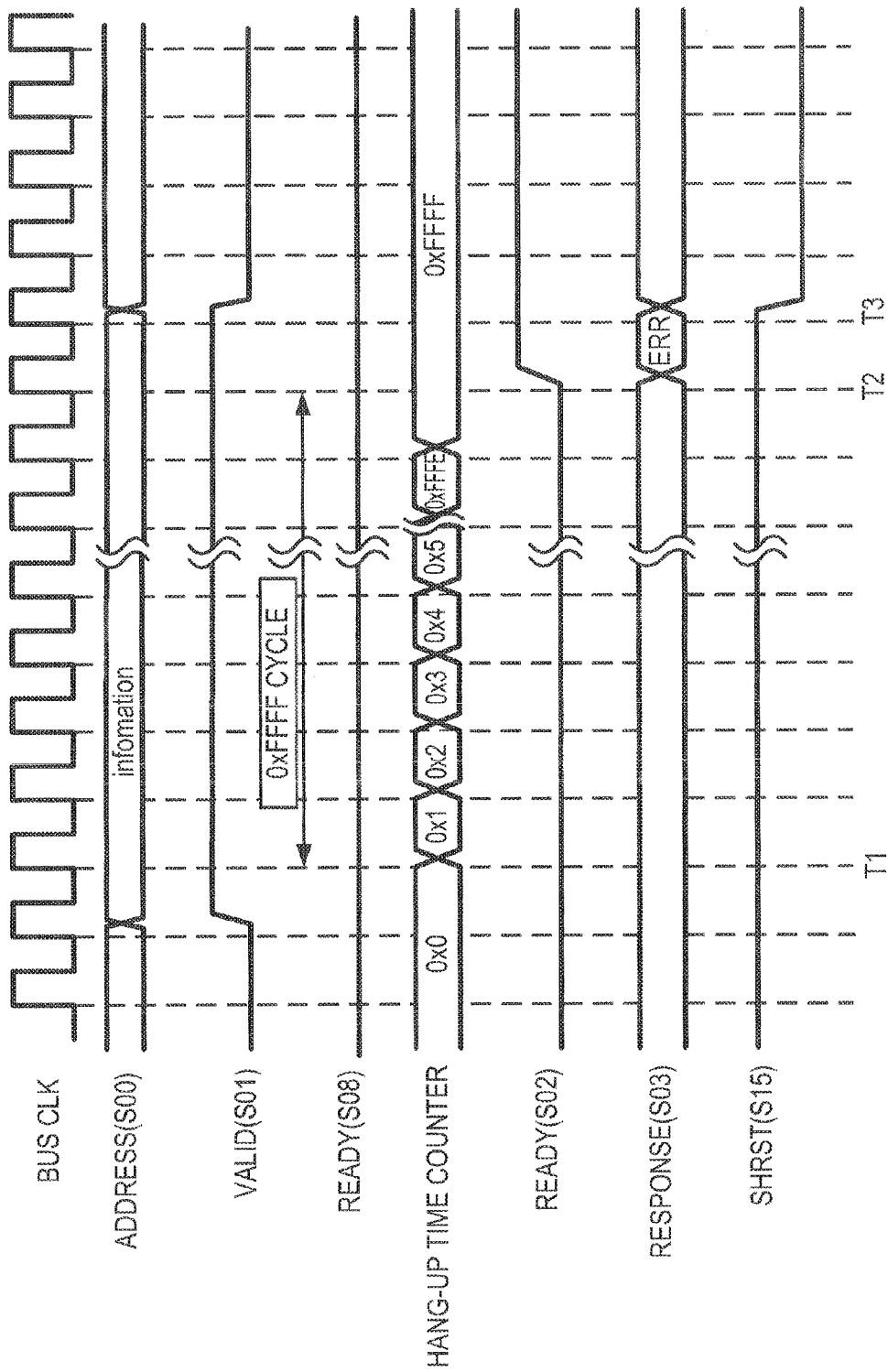
FIG. 6 is a timing chart illustrating an operation example of the prevent hang-up module for slave in the first embodiment.

FIG. 6 is a timing chart illustrating an operation example of the prevent hang-up module for slave 16 illustrated in FIG. 5. It is assumed that the hang-up threshold 202 is set to "0xFFFF".

At time T1, though the valid signal S01 from the master module side is "H" (asserted), the ready signal S08 from the slave module side is "L" (negated). Therefore, at the time T1, the hang-up time counter 106 in the hang-up monitoring circuit 103 starts counting.

When the valid signal S01 and the ready signal S08 do not change and the counter value of the hang-up time counter 106 exceeds the value of the hang-up threshold 202 "0×FFFF" at time T2, the hang-up monitoring circuit 103 judges that a hang-up has occurred. Then, the hang-up monitoring circuit 103 transmits a ready signal instead of the slave module and returns an error (ERROR) response indicating that the transaction has failed. In this way, the ready signal S02 and the response signal S03 are issued to the master module side from the prevent hang-up module for slave 16.

Handing over of the response signal (error response) may also be performed by handshake using a valid signal and a ready signal, depending on the bus protocol. In such a bus, the hang-up monitoring circuit 103 controls the valid signal (ready signal) for handing over the response signal (error response).

By the ready signal S02 and the response signal S03 being transmitted from the prevent hang-up module for slave 16 at the time T2, the transaction ends when seen from the master module side. Then, at time T3, the master module, which has received the ready signal, withdraws the valid signal, data and the like. At the same time, the prevent hang-up module for slave 16 asserts (outputs) a hang-up reset signal SHRST (S15) to a corresponding slave module to reset the slave module. As for release of the reset, that is, negation of the hang-up reset signal SHRST (S15), it is automatically released when a predetermined time has elapsed.

During the reset (initialization) of the hung-up slave module, and before the slave modules starts a normal operation after the reset, the prevent hang-up module for slave 16 (more particularly, the hang-up monitoring circuit 103) returns error responses to accesses from the other master modules. Thereby, the continuous operation of the system is possible until the hung-up slave module starts a normal operation after the hung-up slave module is reset.

According to the first embodiment, the prevent hang-up module for slave 16 for detecting a hang-up is arranged for each slave module 13, and, when a hang-up is detected, a hang-up reset signal SHRST instructing reactivation is outputted to a corresponding slave modules 13. Thus, it is possible to, when a hang-up is detected within the system, locally initialize and reactivate only the hung-up slave module 13 without initializing the whole computer system. Therefore, even if a hang-up occurs, the hang-up can be solved by initializing only the hung-up slave module 13 without influencing the whole computer system. Furthermore, the prevent hang-up module for slave 16 issues an appropriate bus response (such as an error response) instead of the slave modules 13 until the hung-up slave module 13 is initialized and returns to a normal state, and thereby, it is possible to perform a continuous operation without stopping the system.

(Second Embodiment)

A second embodiment of the present invention will be described.

The whole configuration of a computer system according to the second embodiment is similar to the configuration of the computer system according to the first embodiment illustrated in FIG. 2.

Figure 7:
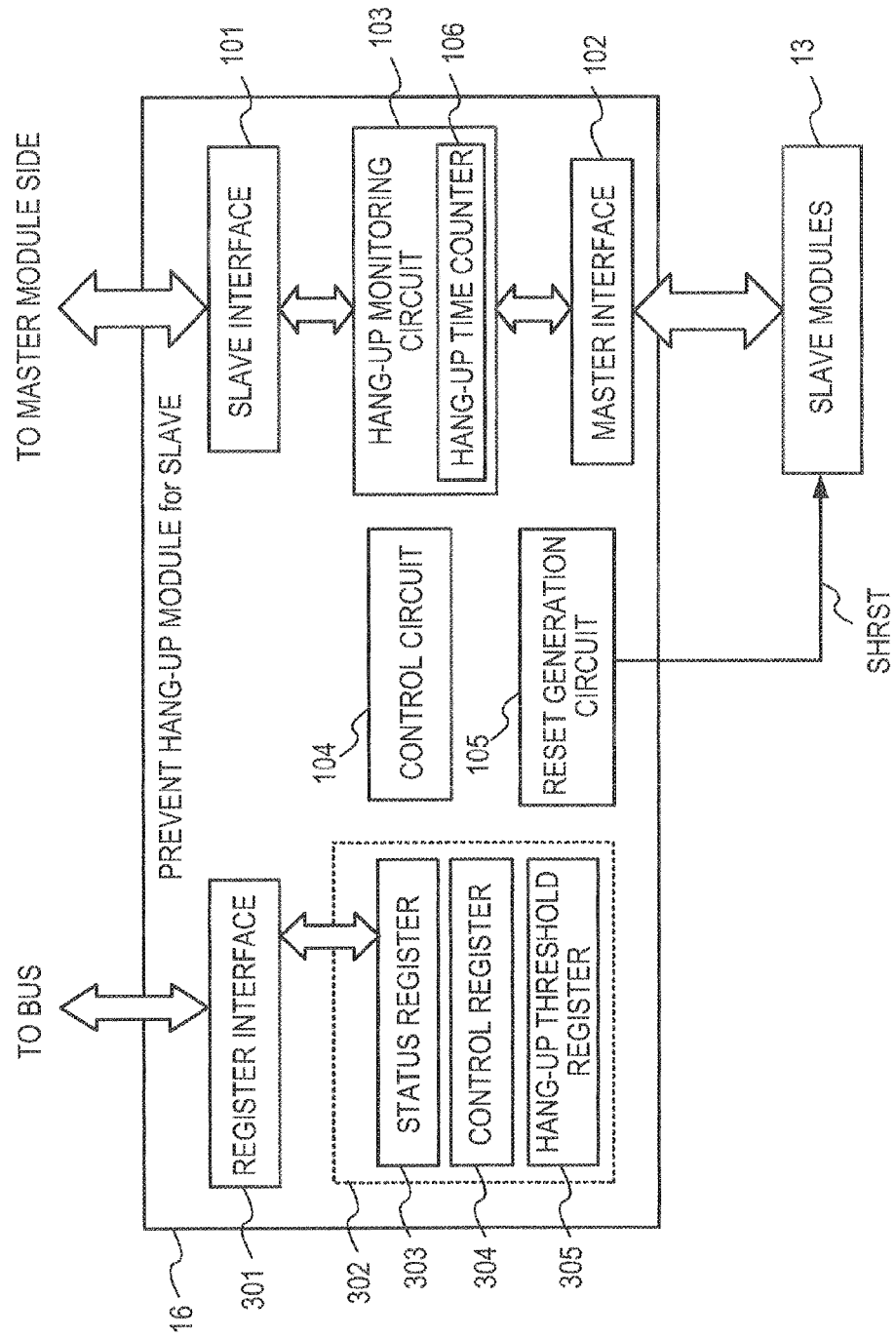
FIG. 7 is a diagram illustrating a configuration example of a prevent hang-up module for slave in a second embodiment.

FIG. 7 is a block diagram illustrating a configuration example of a prevent hang-up module for slave 16 in the second embodiment. In FIG. 7, the same components as illustrated in FIG. 4 are given the same reference numerals, and redundant description thereof will be omitted.

By providing a register interface 301 and a register group 302 for the prevent hang-up module for slave 16 in the second embodiment, the functions of the prevent hang-up module for slave 16 have been expanded.

The register interface 301 is an interface for writing or reading registers in the register group 302. The register interface 301 may be connected to the bus interconnect 12 or may be connected to a bus different from the bus interconnect 12 (for example, a low-speed bus for control).

Each of the registers in the register group 302 is arranged on a memory map as a register accessible from master modules such as a CPU 10, and can be set or read by software. The register group 302 has, for example, a status register 303, a control register 304 and a hang-up threshold register 305.

The status register 303 is a register indicating the state of the prevent hang-up module for slave 16. The status register 303 indicates, for example, information about whether a hang-up has been detected or not, whether initialization of a hung-up slave module has ended or not, which of the master module side and the slave module side a hang-up has occurred on, and the like. When there is no occurrence of hang-up, a normal value is indicated on the status register 303.

The control register 304 is a register for setting a control method. The control register 304 can be used to configure release of reset (such as reset time) when a hang-up occurs, set whether the prevent hang-up module for slave 16 is to be used or not, and the like. The control register 304 may also set whether or not to output a reset signal in the case where a hang-up is detected, set whether or not to output an interrupt signal in the case where a hang-up is detected, and the like. The control register 304 may additionally set the kind (type) of response (error, retry or the like) to be returned by a response signal in the case where a hang-up is detected. By providing the control register 304, it is possible to set an operation and the like to be performed when a hang-up occurs, by software.

The hang-up threshold register 305 is a register for setting a counter value to be counted to determine a hang-up. That is, when the hang-up condition, wherein a ready signal is not asserted though a valid signal has been asserted, continues for more than threshold time specified in the hang-up threshold register 305, the hang-up is detected. By providing the hang-up threshold register 305, it is possible to change the threshold time, which is the time to be elapsed before a hang-up is determined, by software, and it is possible to dynamically set the threshold time according to the computer system.

The registers may be arbitrarily provided in the register group 302. All of the status register 303, the control register 304 and the hang-up threshold register 305 may be provided, or a part of them may be provided. Other registers may be provided. If the hang-up threshold register 305 is not provided, a fixed value set in advance can be provided as a counter value corresponding to the threshold time, similarly to the first embodiment.

Figure 8:
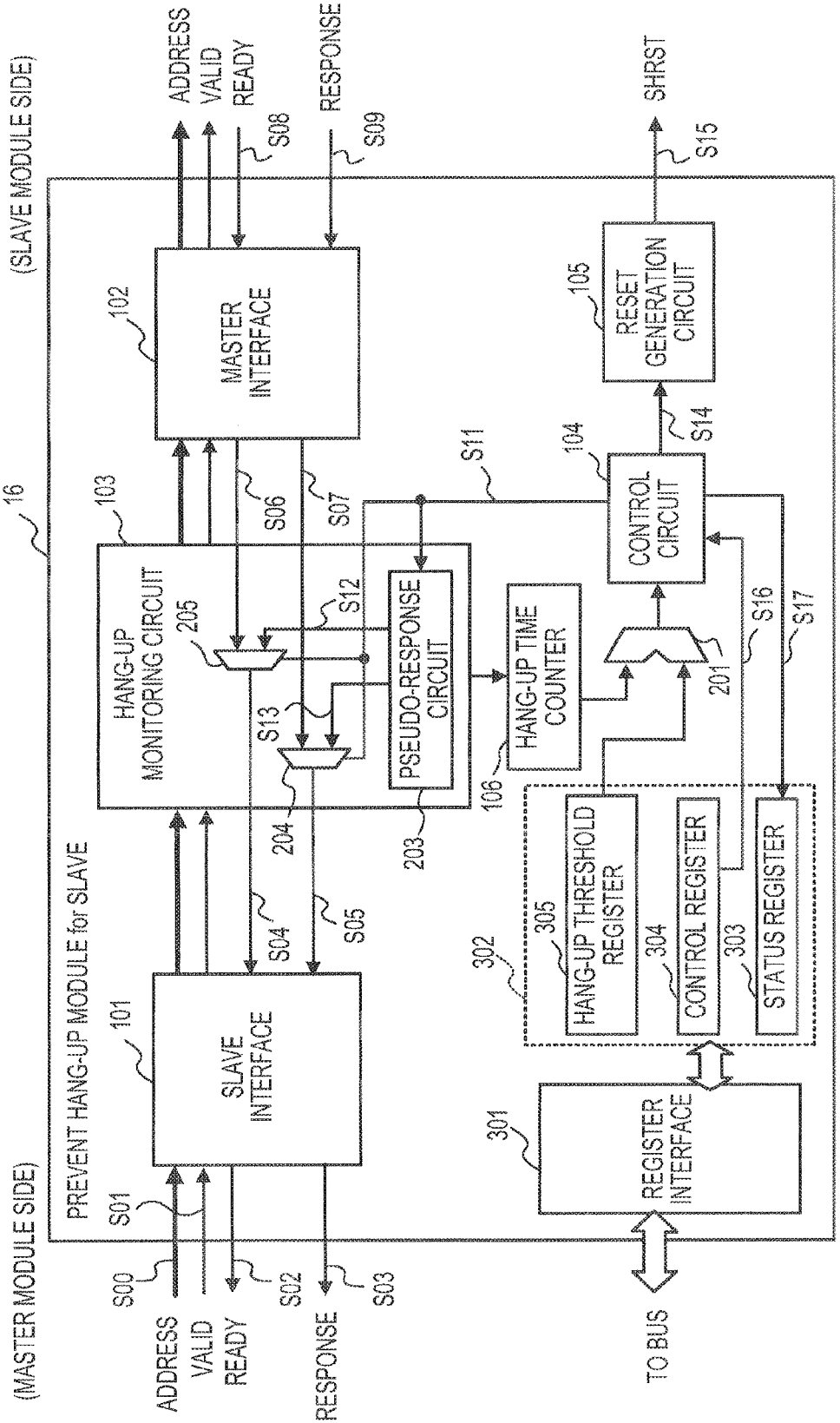
FIG. 8 is a diagram illustrating a detailed configuration example of the prevent hang-up module for slave in the second embodiment.

FIG. 8 is a diagram illustrating a detailed configuration example of the prevent hang-up module for slave 16 in the second embodiment. In FIG. 8, the same components as illustrated in FIGS. 4 and 7 are given the same reference numerals, and redundant description thereof will be omitted.

The counter value corresponding to the threshold time, which is set for the hang-up threshold register 305, is inputted to a comparator 201. For example, a clear signal S16 for clearing a hang-up state, and the like, can be outputted to a control circuit 104 via the control register 304. For example, the status register 303 is provided with a status signal S17 indicating the state of the prevent hang-up module for slave 16, from the control circuit 104, and it keeps the status signal S17. Since the operation for detecting a hang-up and solving the hang-up state is similar to that of the prevent hang-up module for slave 16 in the first embodiment illustrated in FIG. 5, description thereof will be omitted.

Figure 9:
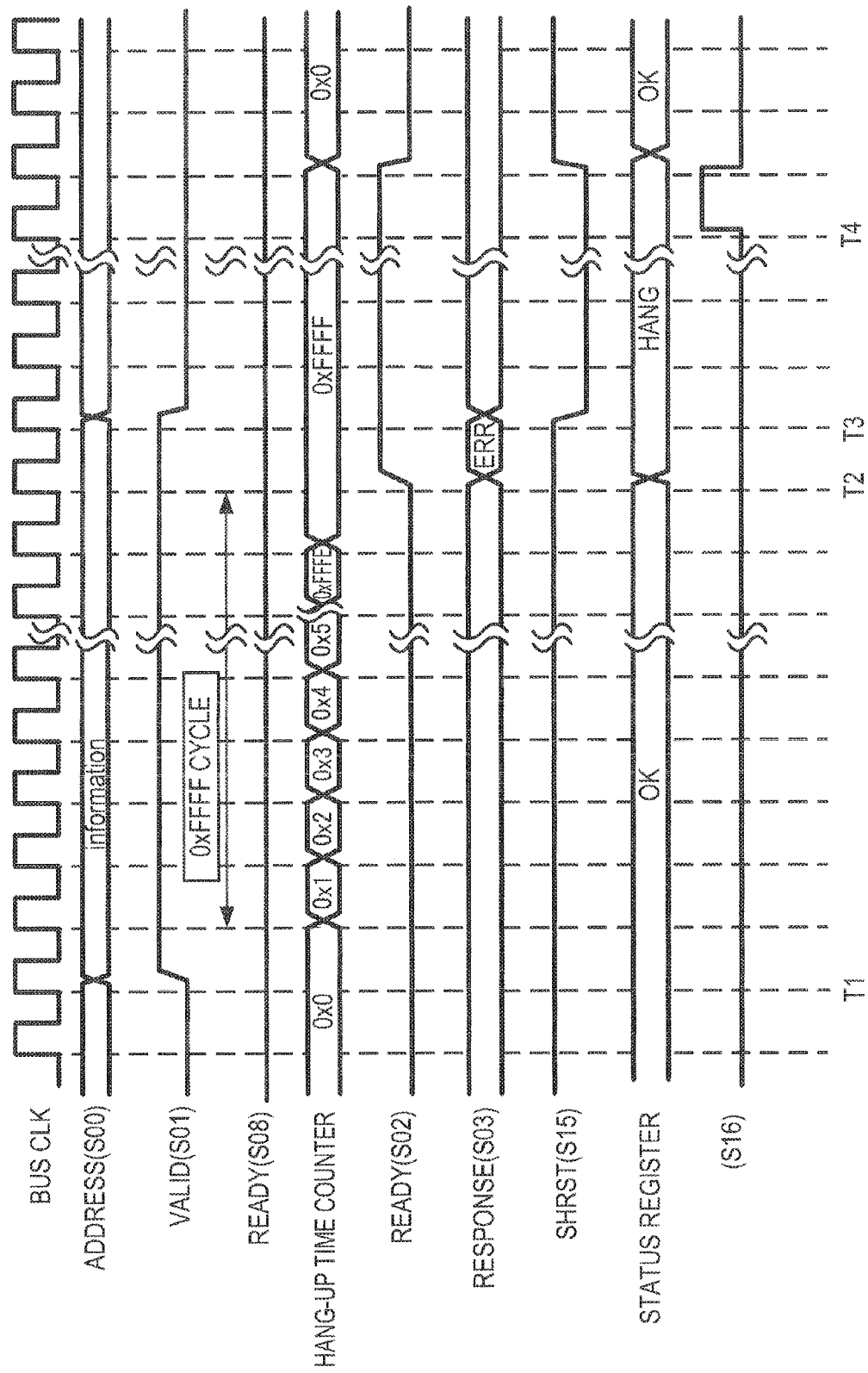
FIG. 9 is a timing chart illustrating an operation example of the prevent hang-up module for slave in the second embodiment.

FIG. 9 is a timing chart illustrating an operation example of the prevent hang-up module for slave 16 illustrated in FIG. 8. It is assumed that "0xFFFF" is set for the hang-up threshold register 305 as the counter value corresponding to the threshold time.

The operation performed until time T13 is similar to the operation in the first embodiment illustrated in FIG. 6. Time T11 corresponds to the time T1 in FIG. 6, and time T12 corresponds to the time T2 in FIG. 6. In the second embodiment, when a hang-up is judged at the time T12, a status "HANG" indicating that a hang-up has been detected is indicated in the status register 303 by the control circuit 104.

When a master module receives an error response transmitted from the prevent hang-up module for slave 16 at the time T12, a data abort exception or a pre-fetch abort exception normally occurs if the master module is a CPU 10. By checking the status register 303 of each prevent hang-up module for slave 16 within these abort handlers, the CPU 10 searches for a slave module which is the hang-up occurrence source. If the master module is not the CPU 10, an interrupt to the CPU 10 is caused when the error response is received, and thereby, processing similar to that performed in the case of the abort handlers is performed within an interrupt handler at the CPU 10 which has received the interrupt, and search for the hang-up occurrence source slave module is performed.

If the status register 303 indicates that the slave module is in the hang-up state ("HANG") while the CPU 10 is executing abort processing, the reset state of the slave module is released by the control register 304. Furthermore, reactivation processing, such as resetting of the registers of the slave module, is performed.

When the CPU 10 sets the control register 304 of the prevent hang-up module for slave 16 to release a hang-up reset, the clear signal S16 is asserted and the reset is released (time T14). At the same time, the status register 303 of the prevent hang-up module for slave 16 returns to a normal state ("OK") from the hang-up state ("HANG"), and the counter value of the hang-up time counter 106 is returned to 0.

According to the second embodiment, it is possible to, when a hang-up is detected within the system, locally initialize and reactivate only the hung-up slave module 13 without initializing the whole system, similar to the first embodiment. Thereby, even if a hang-up occurs, the hang-up can be solved without influencing the whole computer system. Furthermore, the prevent hang-up module for slave 16 issues an appropriate bus response until the hung-up slave module is initialized and returns to a normal state, and thereby, it is possible to perform a continuous operation without stopping the system.

(Other Embodiments)

In the first and second embodiment described above, prevent hang-up modules (abnormality detection modules) are arranged for slave modules. However, the present invention is not limited thereto. It is also possible to arrange prevent hang-up modules for master modules, in addition to the prevent hang-up modules for slave modules.

Figure 10:
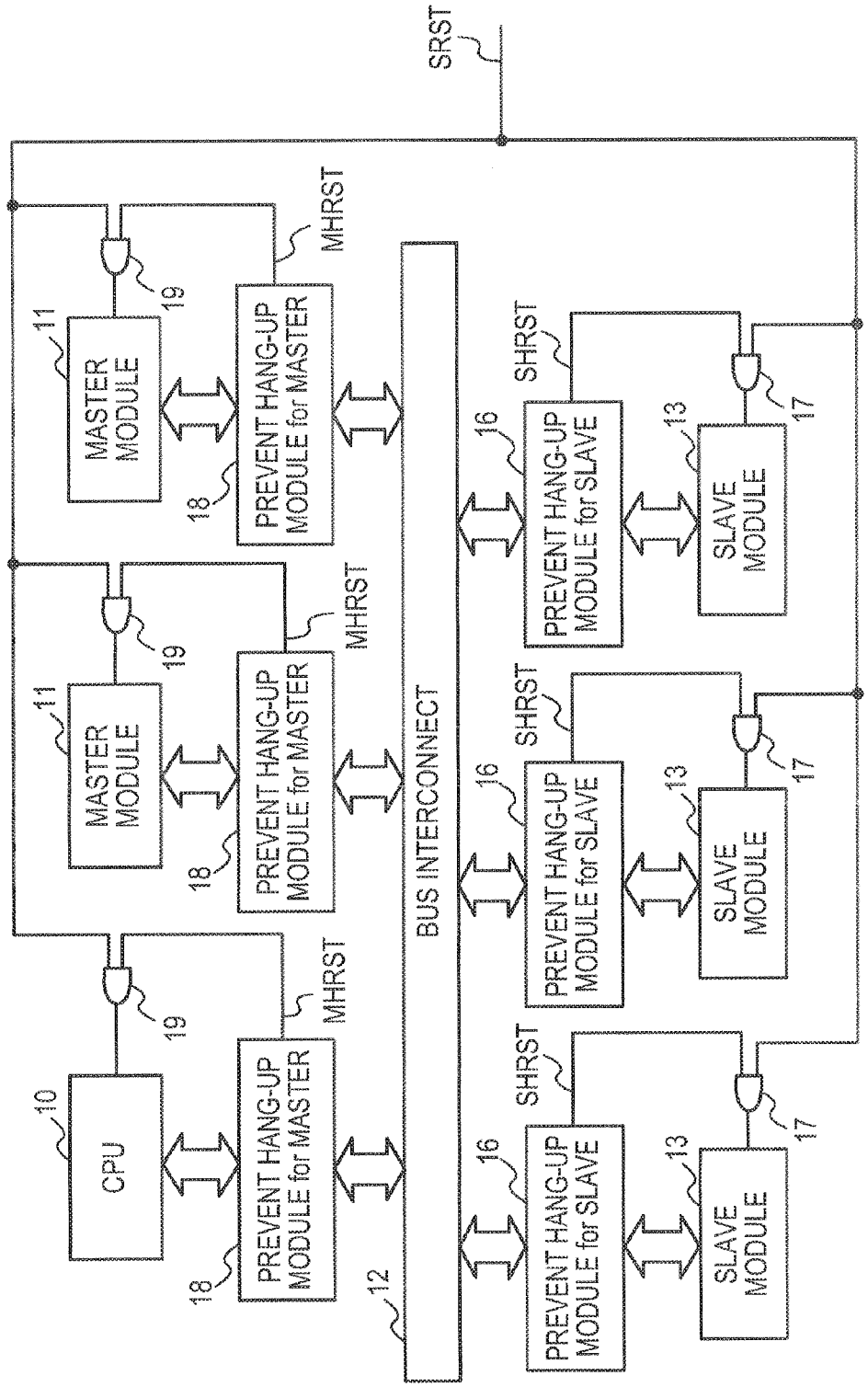
FIG. 10 is a diagram illustrating another configuration example of a computer system according to an embodiment of the present invention.

FIG. 10 is a block diagram illustrating another configuration example of a computer system according to an embodiment of the present invention. In FIG. 10, the same components as illustrated in FIGS. 1 and 2 are given the same reference numerals, and redundant description thereof will be omitted.

In the computer system illustrated in FIG. 10, not only prevent hang-up modules for slaves 16 are arranged for slave modules 13 but also prevent hang-up modules for masters 18 are arranged for master modules (a CPU 10 and master modules 11). That is, in the computer system illustrated in FIG. 10, the prevent hang-up modules for masters 18 are connected between a bus interconnect 12 and the master modules 10 and 11. Each of the master modules 10 and 11 performs communication with the other modules via a corresponding prevent hang-up module for master 18.

Each of the prevent hang-up module for master 18 detects a hang-up by monitoring signals on a bus between a corresponding master module 10 or 11 and the bus interconnect 12. When detecting a hang-up, the prevent hang-up module for master 18 generates and outputs a hang-up reset signal MHRST which instructs reactivation only of the corresponding master module 10 or 11. In this embodiment, the hang-up reset signal MHRST is "H" when it is negated, and "L" when it is asserted.

The hang-up reset signal MHRST outputted from the prevent hang-up module for master 18 is inputted to the corresponding master module 10 or 11 via an AND circuit 19. When the output from the AND circuit 19 is "L", the master module 10 or 11 which receives the output is initialized and reactivated.

The basic operation sequence of the prevent hang-up module for master 18 is similar to that of the prevent hang-up module for slave 16 performed when a slave module hangs up. However, there is, in general, not a bus protocol which has an error response to a slave module, and therefore, the prevent hang-up module for master 18 does not return an error response. Instead, in order to prevent the slave module from keeping a waiting state, the prevent hang-up module for master 18 controls signals to be outputted by the master module, such as write data, so that the slave module can continuously operate.

In FIG. 10, the prevent hang-up modules are arranged for both of the slave modules and the master modules. However, the prevent hang-up modules may be arranged only for the master modules.

In each of the embodiments described above, one independent prevent hang-up module is arranged for each master module and/or for each slave module. However, the present invention is not limited thereto. It is also possible to provide one prevent hang-up module for a module group configured by two or more master modules or by two or more slave modules.

Figure 11:
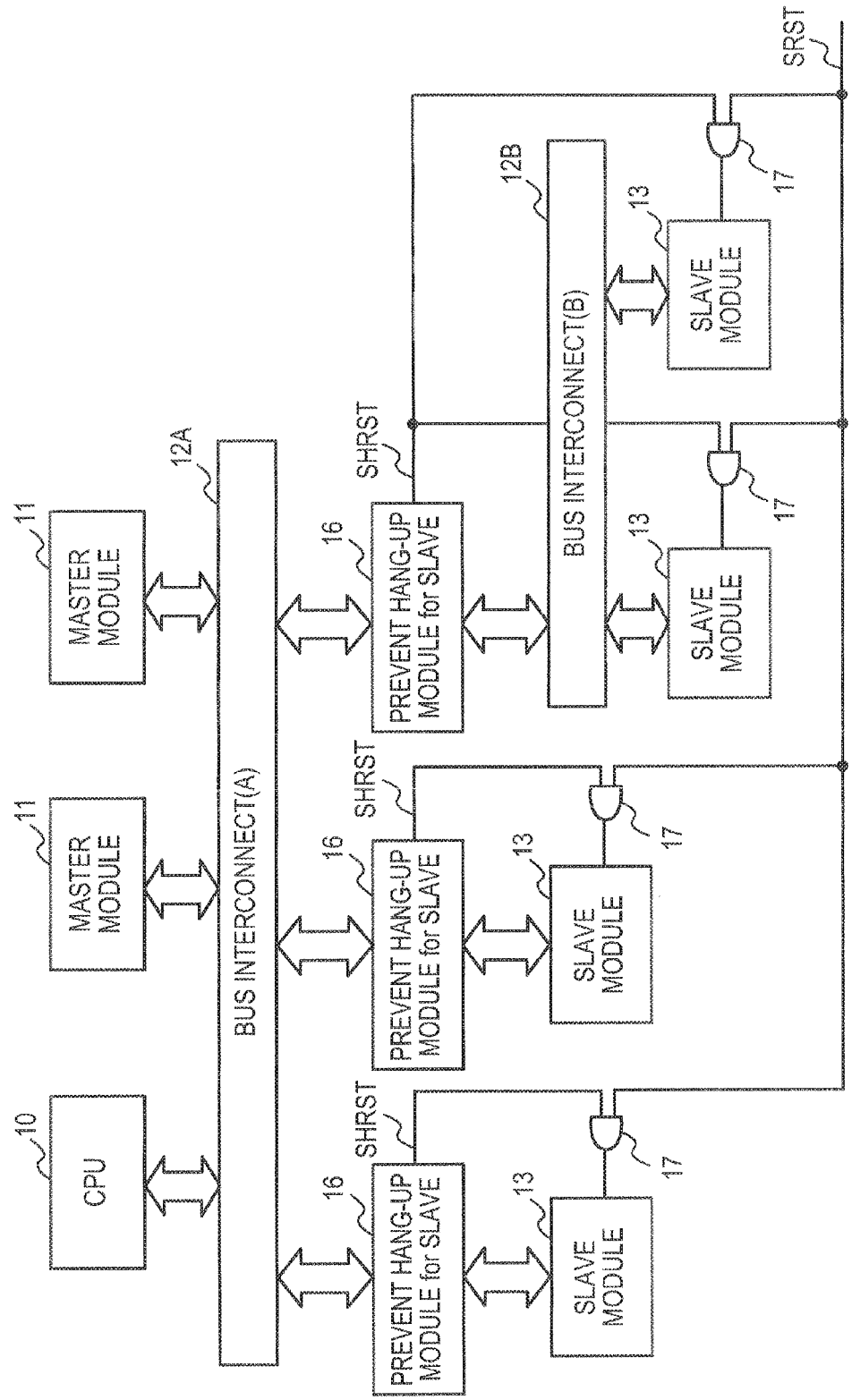
FIG. 11 is a diagram illustrating another configuration example of a computer system according to an embodiment of the present invention.

FIG. 11 is a block diagram illustrating another configuration example of a computer system according to an embodiment of the present invention. In FIG. 11, the same components as illustrated in FIGS. 1 and 2 are given the same reference numerals, and redundant description thereof will be omitted.

In the computer system illustrated in FIG. 11, a bus interconnect (B) 12B is connected to the slave side of a bus interconnect (A) 12A. A prevent hang-up module for slave 16 connected between the bus interconnect (A) 12A and the bus interconnect (B) 12B monitors the hang-up of two slave modules 13 connected to the bus interconnect (B) 12B.

Under such a configuration, if any one of the two slave modules 13 connected to the bus interconnect (B) 12B hangs up, not the whole system but only the two slave modules 13 connected to the bus interconnect (B) 12B are reset. Thereby, only the two slave modules 13 connected to the bus interconnect (B) 12B are initialized and reactivated, and the other modules can be kept continuously operating.

For example, when the bus is separated into multiple parts and connected in a cascade configuration as illustrated in FIG. 11, global hang-up monitoring can be performed for an area of each bus interconnect.

When a CPU 10 identifies a position where a hang-up has been detected, the method of sequentially monitoring the status registers in prevent hang-up modules requires a lot of processing time. In order to improve this situation, a module (register) for integrating the states of all the prevent hang-up modules for slaves 16 and prevent hang-up modules for masters 18 and displaying a list of hang-up occurrences may be provided in the computer system.

Figure 12:
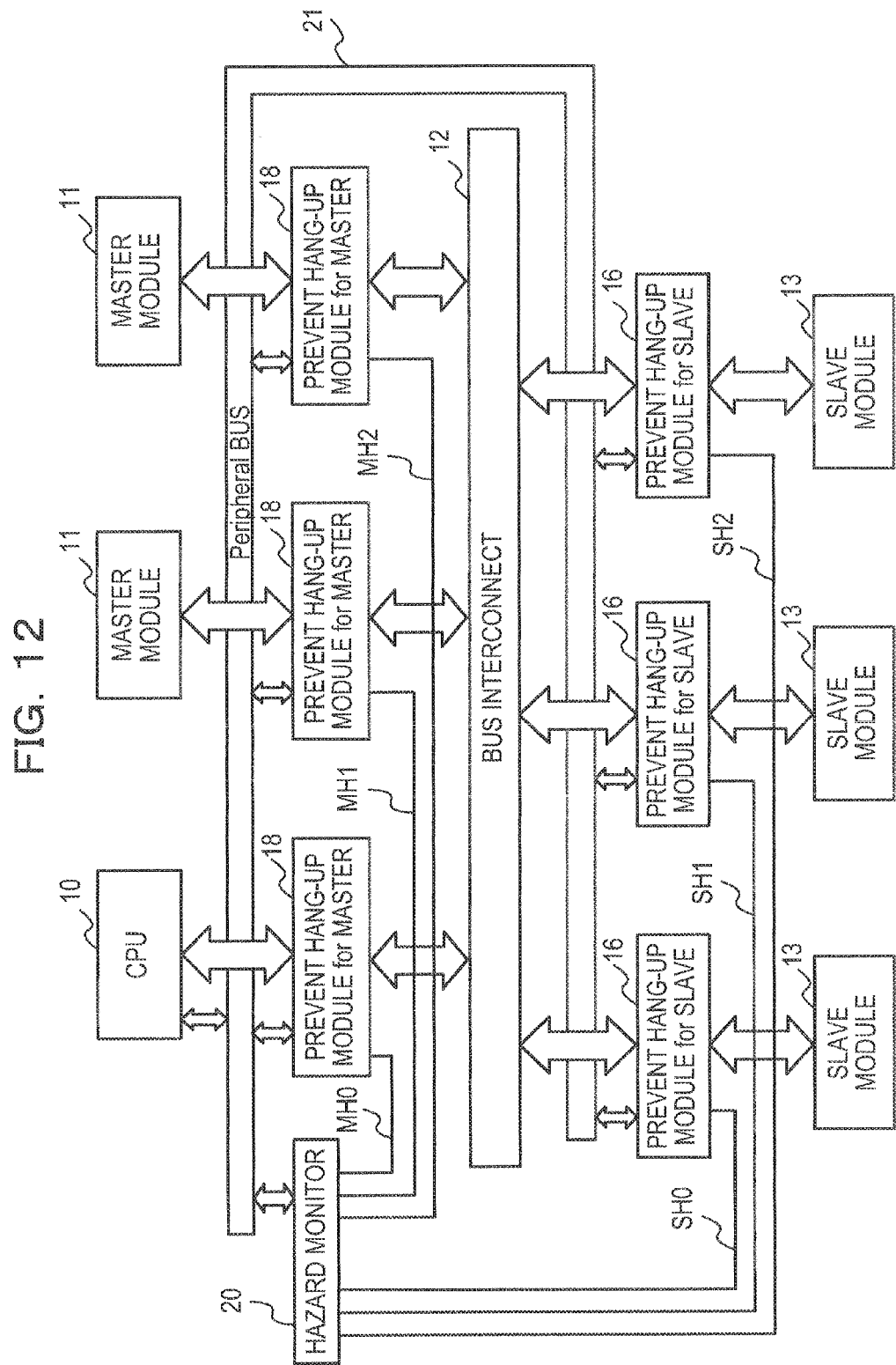
FIG. 12 is a diagram illustrating another configuration example of a computer system according to an embodiment of the present invention.

FIG. 12 is a block diagram illustrating another configuration example of a computer system according to an embodiment of the present invention. In FIG. 12, the same components as illustrated in FIGS. 1, 2 and 10 are given the same reference numerals, and redundant description thereof will be omitted. The computer system illustrated in FIG. 12 is provided with a hazard monitor module 20 for displaying a list of hang-up occurrences. In FIG. 12, reference numeral 21 denotes a peripheral bus, which is, for example, a low-speed bus for accessing registers.

In the computer system illustrated in FIG. 12, all prevent hang-up modules for slaves 16 and prevent hang-up modules for masters 18 in the system have signals SH0 to SH2 and MH0 to MH2 indicating whether corresponding modules 10, 11 and 13 have hung up or not. These signals SH0 to SH2 and MH0 to MH2 are all integrated to one hazard monitor module 20 having a register representing each bit and each of the prevent hang-up modules for slaves 16 and prevent hang-up modules for masters 18, corresponding to each other.

The register of the hazard monitor module 20 is arranged on a memory map accessible from a CPU 10, and the CPU 10 monitors the value of this register by software. Thereby, the CPU 10 can know a hang-up detection state, for all the prevent hang-up modules for slaves 16 and prevent hang-up modules for masters 18, only by checking the register of the hazard monitor module 20. Therefore, the necessity of processing for checking the status registers in the prevent hang-up modules one by one is eliminated, and the processing for searching for a module in which a hang-up has been detected can be reduced.

In each of the embodiments described above, when prevent hang-up modules are provided for slave modules, they are provided in a manner that all the slave modules are to be targeted by hang-up detection. Furthermore, when prevent hang-up modules are provided for master modules, they are provided in a manner that all the master modules are to be targeted by hang-up detection. However, the present invention is not limited thereto. The prevent hang-up modules may be provided not for all the slave modules but for a part of the slave modules. Similarly, the prevent hang-up modules may be provided not for all the master modules but for a part of the master modules.

Furthermore, the prevent hang-up modules and watchdog timers may be used together as illustrated in FIG. 2 and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer system, comprising:
   a plurality of modules configured to perform communication via a first bus; and
   a plurality of abnormality detection circuits configured to monitor signals on the bus related to communication between the plurality of modules to detect a hang-up, wherein each of the abnormality detection circuits is connected between the first bus and a corresponding module; and
   a hazard module configured to connect with and receive hang-up detection signals from each of the plurality of abnormality detection circuits via a second bus;
   wherein when an abnormality detection circuit detects the hang-up, the abnormality detection circuit issues a response, via the first bus, to access requests from one or more of the plurality of modules, and the computer system is configured to monitor the hazard module to generate and output a signal instructing a reactivation only of the corresponding module while avoiding an initialization of the remaining plurality of modules based on the received hang-up detection signals via the second bus.

2. The computer system according to claim 1, wherein the abnormality detection circuit is configured to detect the hang-up if a state in which no response from the corresponding module to a request continues for a predetermined period in the communication between the modules.

3. The computer system according to claim 2, wherein the abnormality detection circuit has a register configured to set the predetermined period for detecting the hang-up.

4. The computer system according to claim 1, wherein the abnormality detection circuit has a register configured to represent that the hang-up has been detected.

5. The computer system according to claim 1, wherein the abnormality detection circuit has a register configured to set whether or not to output a reset signal or an interrupt signal when the hang-up is detected.

6. The computer system according to claim 1, wherein the abnormality detection circuit has a register configured to set the kind of the response returned by the response circuit.

7. The computer system according to claim 1, wherein the hazard module comprises a register configured to represent hang-up occurrences in the system as a list on the basis of a result of hang-up detection in each of the abnormality detection circuits.

8. The computer system according to claim 1, wherein one abnormality detection circuit is independently arranged for each of the modules.

9. The computer system according to claim 1, wherein at least one abnormality detection circuit is arranged to correspond to a module group including two or more of the modules.

10. The computer system according to claim 1, wherein the abnormality detection circuits are arranged for the slave-side modules among the multiple modules.

11. The computer system according to claim 1, wherein the abnormality detection circuits are arranged for the master-side modules among the multiple modules.

12. The computer system according to claim 1, wherein a signal instructing reactivation of the module is generated and outputted outside the abnormality detection circuit.

13. An abnormality detection circuit which is included in a computer system, the computer system having a plurality of modules that perform communication via a first bus for detecting a hang-up for a corresponding module among the plurality of modules, and a hazard module configured to connect with and receive hang-up detection signals from each of the plurality of abnormality detection circuits via a second bus, the abnormality detection circuit comprising:

a detection circuit connected between the bus and the corresponding module configured to monitor signals on the bus related to communication between the plurality of modules to detect a hang-up of the corresponding module; and a signal generation circuit configured to, when the hang-up is detected by the detection circuit, issue a response to access requests from one or more of the plurality of modules, wherein computer system is configured to monitor the hazard module to generate and output a signal instructing a reactivation only of the corresponding module while avoiding an initialization of the remaining plurality of modules based on the received hang-up detection signals via the second bus;

wherein the detection circuit detects the hang-up if no response from the corresponding module to a request continues for a predetermined period in the communication between the modules.

14. The abnormality detection circuit according to claim 13, further comprising a register configured to set the predetermined period for the detection of the hang-up.

15. The abnormality detection circuit according to claim 13, further comprising a register configured to represent that the hang-up of the corresponding module has been detected.

16. The abnormality detection circuit according to claim 13, further comprising a register configured to set whether or not to output a reset signal or an interrupt signal when the hang-up of the corresponding module is detected.

17. The abnormality detection circuit according to claim 13, further comprising a register configured to set the kind of the response returned by the response circuit.

* * * * *